US012578354B2

(12) United States Patent     (10) Patent No.:    US 12,578,354 B2

Yao              (45) Date of Patent:     Mar. 17, 2026

(54) VIBRATING PIPETTE TIPS AND METHODS OF PREVENTING PIPETTE TIP STICTION

(71) Applicant: Siemens Healthcare Diagnostics Inc., Tarrytown, NY (US)

(72) Inventor: Simin Yao, Boonton, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 734 days.

(21) Appl. No.: 17/754,529

(22) PCT Filed: Oct. 6, 2020

(86) PCT No.: PCT/US2020/054335

§ 371 (c)(1),
(2) Date: Apr. 5, 2022

(87) PCT Pub. No.: WO2021/086550

PCT Pub. Date: May 6, 2021

(65) Prior Publication Data

US 2024/0061005 A1     Feb. 22, 2024

Related U.S. Application Data

(60) Provisional application No. 62/926,643, filed on Oct. 28, 2019.

(51) Int. Cl.
G01N 35/10               (2006.01)
(52) U.S. Cl.
CPC . G01N 35/1079 (2013.01); G01N 2035/1058 (2013.01)

(58) Field of Classification Search
None
See application file for complete search history.

(56) References Cited

U.S. PATENT DOCUMENTS

| | | | | |
|---|---|---|---|---|
| 3,780,992 | A | | 12/1973 | Nishi et al. |
| 4,612,291 | A | * | 9/1986 | Dawes .................. B01F 31/441 |
| | | | | 422/224 |
| 5,365,798 | A | | 11/1994 | Kressirer |
| 5,449,493 | A | * | 9/1995 | Rokugawa ............ B01F 31/445 |
| | | | | 310/329 |

(Continued)

FOREIGN PATENT DOCUMENTS

| | | |
|---|---|---|
| CA | 2130129 | 3/1995 |
| CH | 365710 | 11/1962 |

(Continued)

OTHER PUBLICATIONS

Zhou, Xiangping et al; "Research on key technologies of small fully automatic biochemical analyzer micropipetting system"; China Academic Journal Electronic Publishing House; published: Nov. 15, 2018, English Abstract.

(Continued)

*Primary Examiner* — P. Kathryn Wright

(57) ABSTRACT

A pipette assembly configured to aspirate liquid from a well having a cover includes: a pipette including a terminal end; a pipette tip detachably coupled to the terminal end; and a vibration inducer configured to vibrate the pipette tip when at least a portion of the pipette tip is located in the well thus reducing stiction between the cover and the pipette tip. This minimizes the pipette tip from getting detached from the pipette and stuck in the cover. Other systems and methods including vibrating a pipette tip are disclosed.

20 Claims, 8 Drawing Sheets

(56)                References Cited

U.S. PATENT DOCUMENTS

| | | | |
|---|---|---|---|
| 10,514,329 | B1 * | 12/2019 | Toms .................. B01F 31/445 |
| 2003/0213905 | A1 | 11/2003 | Lennon et al. |
| 2006/0093525 | A1 * | 5/2006 | Brunner ............ G01N 35/1011 |
| | | | 422/63 |
| 2007/0122312 | A1 * | 5/2007 | Chojnacki ............. G01N 35/10 |
| | | | 422/561 |
| 2007/0180935 | A1 | 8/2007 | Angus et al. |
| 2008/0078257 | A1 | 4/2008 | Daniel et al. |
| 2011/0000276 | A1 | 1/2011 | Wasserman et al. |
| 2013/0324822 | A1 | 12/2013 | Prais et al. |
| 2014/0099240 | A1 | 4/2014 | Misono |
| 2016/0341755 | A1 * | 11/2016 | Wilmes .................. B01L 3/021 |
| 2018/0029038 | A1 | 2/2018 | Sasaki et al. |
| 2018/0231541 | A1 | 8/2018 | Van Cleve et al. |
| 2019/0193072 | A1 | 6/2019 | Schwartz |
| 2019/0270086 | A1 | 9/2019 | Harding et al. |
| 2021/0077991 | A1 | 3/2021 | Edwards |
| 2021/0165006 | A1 | 6/2021 | Ballen et al. |

FOREIGN PATENT DOCUMENTS

| | | |
|---|---|---|
| CN | 1127359 | 7/1996 |
| CN | 205262834 | 5/2016 |
| CN | 109477853 | 3/2019 |
| CN | 110213992 | 9/2019 |
| DE | 102007004856 | 8/2008 |
| DE | 102010001229 | 7/2011 |
| DE | 102011075828 | 11/2012 |
| EP | 0895088 | 2/1999 |
| EP | 1669762 | 6/2006 |
| EP | 1685902 | 8/2006 |
| EP | 1975629 | 10/2008 |
| EP | 3096148 | 11/2016 |
| JP | H11271206 | 10/1999 |
| JP | 2006208373 | 8/2006 |
| WO | 2015166134 | 11/2015 |

OTHER PUBLICATIONS

Jiang, C. et al; "Reduction of *Saccaromyces* cell adhesion by liquid mechanical vibration"; Letters in Applied Microbiology; published: Jul. 1, 1996; pp. 27-30.

International Search Report for PCT/US2020/054335 dated Feb. 9, 2021.

* cited by examiner

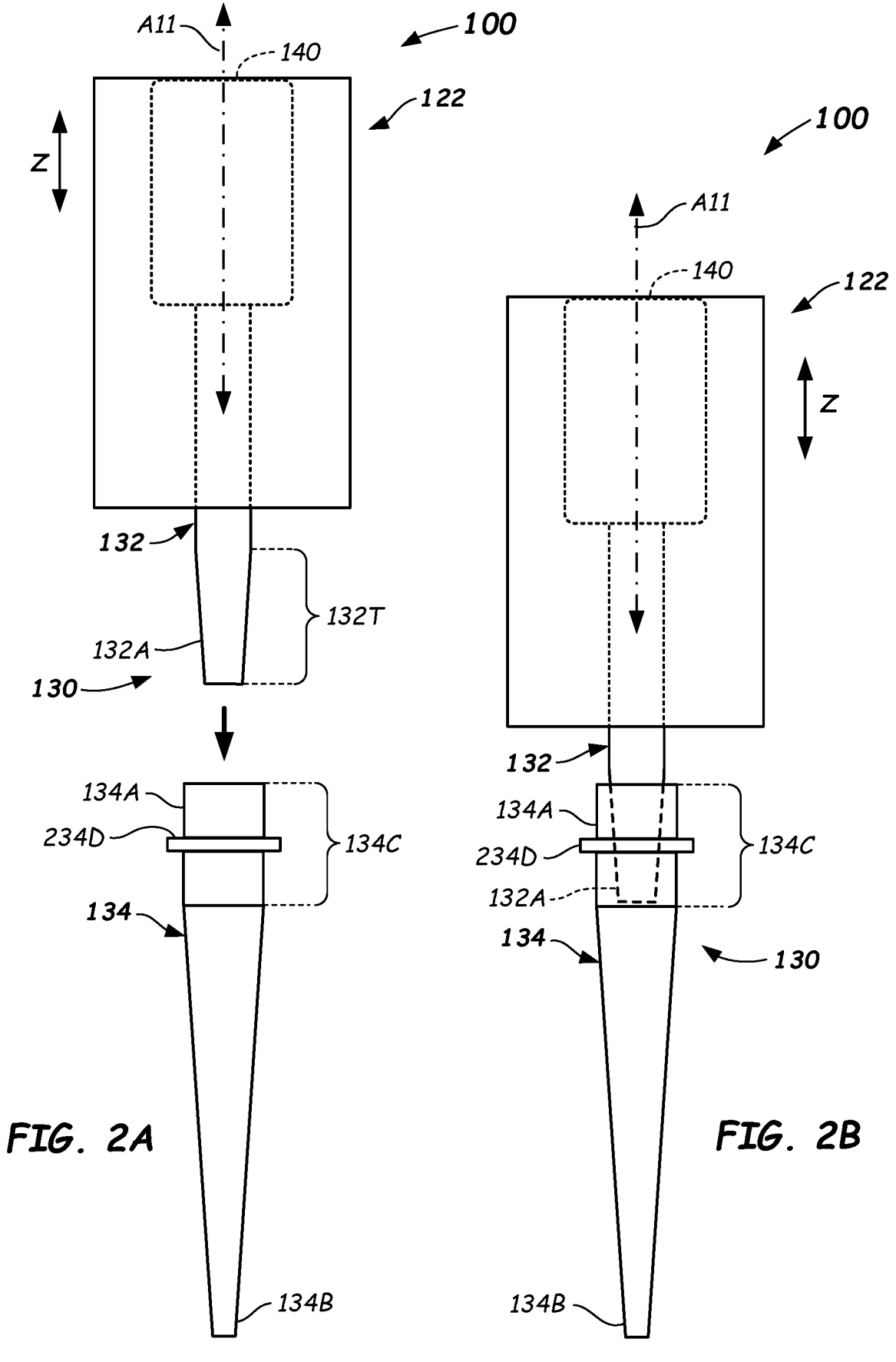
*FIG. 2A*                                                   *FIG. 2B*

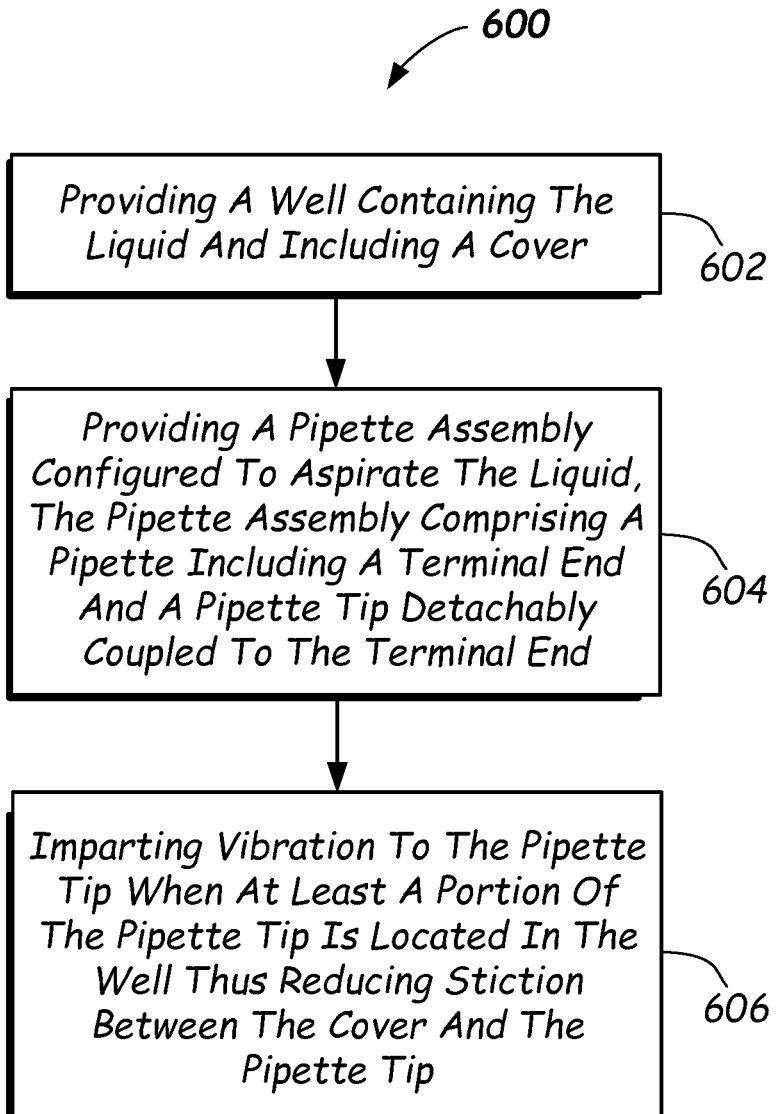

*600*

Providing A Well Containing The Liquid And Including A Cover ⟍ *602*

Providing A Pipette Assembly Configured To Aspirate The Liquid, The Pipette Assembly Comprising A Pipette Including A Terminal End And A Pipette Tip Detachably Coupled To The Terminal End ⟍ *604*

Imparting Vibration To The Pipette Tip When At Least A Portion Of The Pipette Tip Is Located In The Well Thus Reducing Stiction Between The Cover And The Pipette Tip ⟍ *606*

*FIG. 6*

VIBRATING PIPETTE TIPS AND METHODS OF PREVENTING PIPETTE TIP STICTION

FIELD

The present disclosure relates to methods, assemblies, and apparatus adapted to aspirate and dispense liquids.

BACKGROUND

In automated analytical testing, various liquids may be aspirated from one location and dispensed to another location, such as to a reaction vessel (e.g., a cuvette). In certain analyzers used to test for the presence of an analyte or other constituent in a biological fluid sample (otherwise referred to as "specimen"), it may be desirable to utilize one or more moveable pipette assemblies coupled to one or more aspiration/dispense systems to aspirate and then dispense a reagent and the specimen.

A fairly large number of reagents may be contained in individual wells, such as individual wells of reagent cartridges, referred to herein as "reagent packs," or other vessels. The reagent packs may be supported on a carousel or other like moveable member. The pipette assembly can include a pipette body and a detachable (and disposable) pipette tip coupled to the pipette body. For example, the pipette tip may be a molded plastic pipette tip that is coupled to the pipette body and then discarded after one or more aspiration/dispense sequences. In some embodiments, the pipette tip may be separated from the pipette body by application of a force and subsequently placed in a disposal canister.

The pipette assembly can include a robot coupled thereto for moving the pipette assembly between the specimen or reagent pack(s) and a reaction vessel within the analyzer. The robot may be able to move the pipette assembly in an X and Y motion, a sweeping (theta) motion, and/or, an r and theta motion. Further, the robot may be able to raise and lower the pipette assembly in a Z motion so as to insert and retract the pipette tip into and out of various wells.

The reagent packs contain one or more volumes of a process liquid (e.g., a reagent) and have one or more covers (e.g., foil cover(s)) over a top thereof to seal the respective individual wells. When accessing the reagent pack with the pipette, the pipette tip acts as a lance to pierce the cover over an individual well.

Any malfunction of the pipette assembly can cause throughput disruptions.

SUMMARY

According to a first aspect, a pipette assembly configured to aspirate liquid from a well having a cover is provided. The pipette assembly includes a pipette including a terminal end; a pipette tip detachably coupled to the terminal end; and a vibration inducer configured to vibrate the pipette tip when at least a portion of the pipette tip is located in the well thus reducing stiction between the cover and the pipette tip.

According to a second aspect, a testing apparatus is provided. The testing apparatus includes a well containing a liquid (e.g., a reagent liquid) and including a cover; a pipette assembly configured to aspirate the liquid contained in the well, the pipette assembly comprising: a pipette including a terminal end; a pipette tip detachably coupled to the terminal end; and a vibration inducer configured to vibrate the pipette tip when at least a portion of the pipette tip is located in the well thus reducing stiction between the cover and the pipette tip.

In a method aspect, a method of moving a pipette assembly adapted to aspirate a liquid is provided. The method includes providing a well containing the liquid and including a cover; providing the pipette assembly configured to aspirate the liquid, the pipette assembly comprising a pipette including a terminal end and a pipette tip detachably coupled to the terminal end; and imparting vibration to the pipette tip when at least a portion of the pipette tip is located in the well thus reducing stiction between the cover and the pipette tip.

Still other aspects, features, and advantages of the present disclosure may be readily apparent from the following description by illustrating a number of example embodiments and implementations. The present disclosure may also be capable of other and different embodiments, and its several details may be modified in various respects, all without departing from the scope thereof. Accordingly, the drawings and descriptions are to be regarded as illustrative in nature, and not as restrictive. The disclosure is to cover all modifications, equivalents, and alternatives falling within the scope of the claims.

BRIEF DESCRIPTION OF THE DRAWINGS

The drawings, described below, are for illustrative purposes only and are not necessarily drawn to scale. The drawings are not intended to limit the scope of the disclosure in any way. Like numerals are used throughout to denote the same or like elements.

FIG. 2A illustrates a side, elevation view of a pipetting system showing a pipette tip detached from a pipette according to one or more embodiments.

FIG. 2B illustrates a side, elevation view of a pipetting system showing a pipette tip attached to a pipette according to one or more embodiments.

FIG. 6 illustrates a flowchart of a method of moving a pipette assembly adapted to aspirate a liquid according to one or more embodiments.

DETAILED DESCRIPTION

Figure 1A:
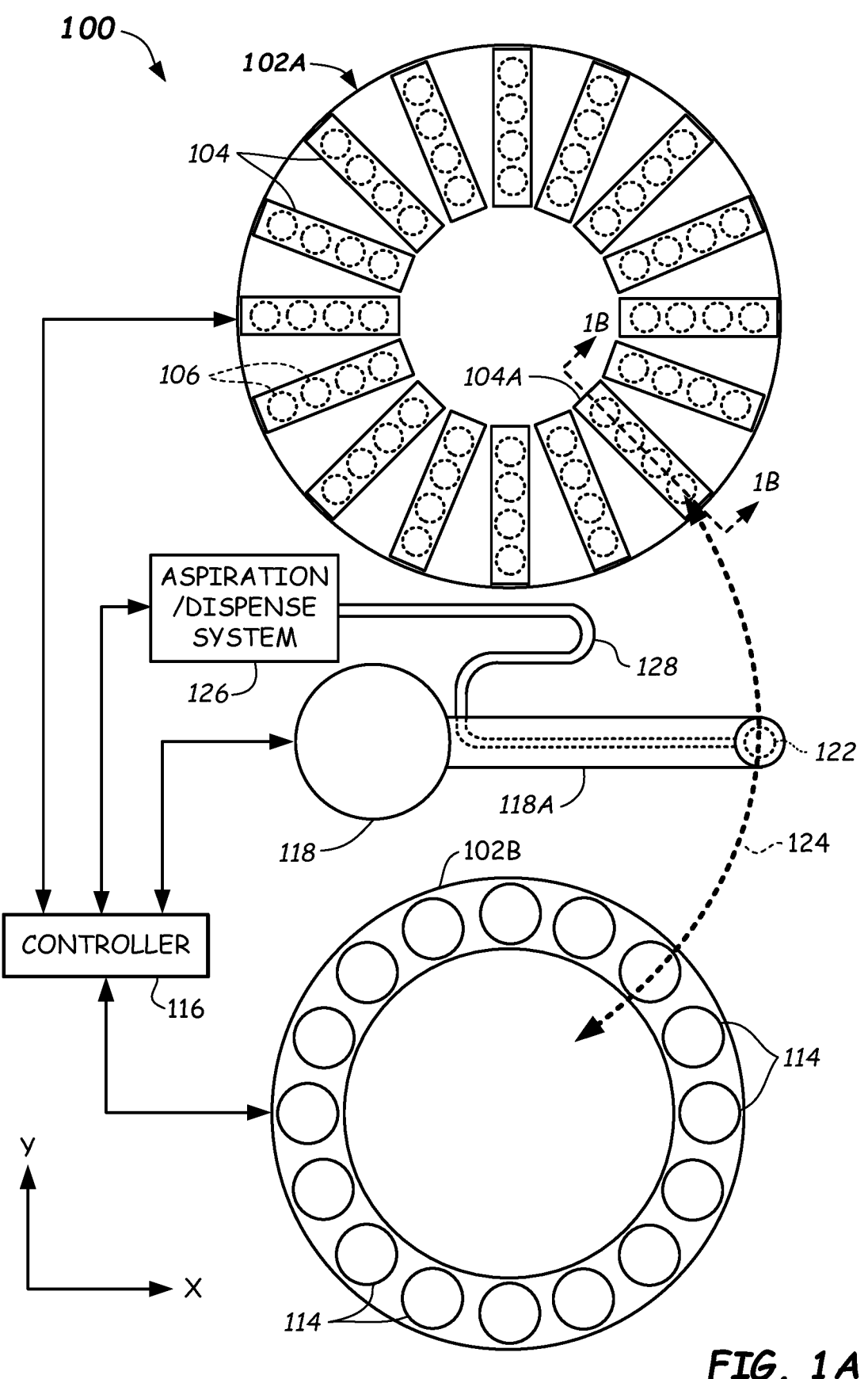
FIG. 1A illustrates a top view of a block diagram of portions of a testing apparatus according to one or more embodiments.

In analytical testing, such as in biological fluid testing, various liquids may be aspirated from one well and dispensed to another well. The wells may be vessels and the like containing reagents and/or biological fluid samples (otherwise referred to as "specimens"). Some analyzers are used to test for the presence of an analyte or another constituent in one or more specimens. These analyzers may use one or more process liquids, such as one or more reagents, during testing, wherein the process liquids may be stored in one or more reagent packs including one or more wells formed therein. Each well in a reagent pack may contain a volume of a process liquid (e.g., a reagent) and each well may have a cover (e.g., a foil cover) over a top thereof.

An analyzer may include a moveable pipette assembly that accesses reagents and/or other liquids located in the wells. The pipette assembly may include a pipette body (referred to as a "pipette") having a removable pipette tip attached to a terminal end of the pipette. The pipette tip contacts the liquid in a well and may be discarded after contacting the liquid. For example, after accessing the liquid, the analyzer may maneuver the pipette assembly so as to discard the pipette tip into a waste receptacle and replace the pipette tip with a new pipette tip. When accessing a well with a pipette tip, the pipette tip may function as a lance to pierce the cover so as to enable access to the liquid. In some embodiments, the pipette tips are configured to stir liquids in the wells.

The pipette tip can, in certain instances, get stuck in a well when the pipette tip is being retracted from the well. This is especially true in cases where the pipette tip is initially inserted and the aspiration occurs near the top of the fluid. In such instances, the pipette tip can get stuck in the cover of the well and can thus be separated from the pipette as the robot moves the pipette vertically in the Z direction. This separation may only cause a minor disruption in cases where the operation of the analyzer is being overseen by an operator. For example, the operator may access and remove the stuck pipette tip from the well. However, in some instances, such during automated testing at night, there may be hundreds or even thousands of tests running automatically. If a single pipette tip gets stuck in a well, the stuck pipette tip can stop the analyzer from performing the automated tests for several hours, or even a whole shift, until an operator can remove the stuck pipette tip. In these instances, hours of testing can be lost, with accompanying loss in productivity and throughput.

Apparatus and methods of accessing wells that prevent pipette tips from sticking in the cover and remaining within the wells are disclosed herein. According to one or more embodiments of the disclosure, a pipette assembly configured to aspirate liquids from covered wells is disclosed. The pipette assembly may include a pipette including a terminal end with a pipette tip detachably coupled to the terminal end. A vibration inducer is configured to vibrate the pipette tip when at least a portion of the pipette tip is located within the well. The vibration reduces stiction between the cover and the pipette tip. The vibration inducer can be coupled to the pipette or other suitable location enabling vibration of the pipette tip.

These and other aspects and features of embodiments of the disclosure will be described with reference to FIGS. 1A-6 herein.

Reference is now made to FIG. 1A, which illustrates a top schematic view of portions of a testing apparatus 100. The testing apparatus 100 may include more components than are illustrated in FIG. 1A, such as heater(s), wash station(s), cuvette and pipette tip loaders, reader(s) for determining concentration levels of an analyte or constituent, waste receptacles, motors, controllers and other conventional components not shown. The testing apparatus 100 may include a reagent carousel 102A that supports a plurality of reagent packs 104. Each of the reagent packs 104 may include one or more wells 106 (shown dotted). Covers (not shown in FIG. 1A) may be sealed over the one or more wells 106. Other embodiments of the testing apparatus 100 may include wells that are located in devices other than reagent packs.

Figure 1B:
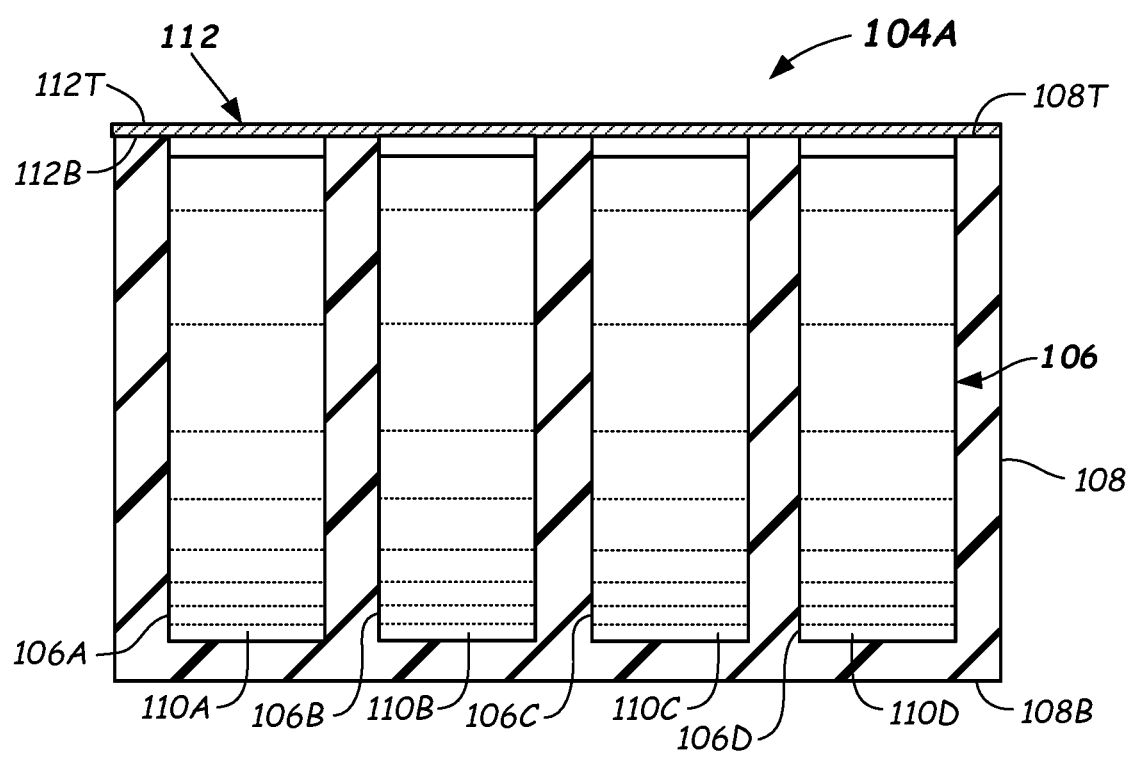
FIG. 1B illustrates a cross-sectioned side view of a reagent pack used in a testing apparatus according to one or more embodiments.

Additional reference is made to FIG. 1B, which illustrates a side cross-sectioned view of an example of a reagent pack 104A. The reagent pack 104A may be identical to the other reagent packs 104 in the reagent carousel 102A (FIG. 1A) or optionally, the reagent packs 104A may each have a different configuration, such as including more or less numbers of wells 106. The reagent pack 104A may include a reagent pack body 108, formed from a plastic material, and a plurality of wells 106 formed in the reagent pack body 108. The reagent pack body 108 may include a reagent pack top surface 108T and a reagent pack bottom surface 108B that may be located opposite the reagent pack top surface 108T. The wells 106 may form openings in the reagent pack top surface 108T that extend to locations proximate the reagent pack bottom surface 108B. Each well 106 in the reagent pack body 108 may include an open top and a closed bottom. In the embodiment depicted in FIG. 1B, the reagent pack 104A includes four wells, which are referred to individually as a first well 106A, a second well 106B, a third well 106C, and a fourth well 106D. Other embodiments of the reagent pack 104A may include more or fewer than four wells.

The wells 106 may contain liquids. In the embodiment depicted in FIG. 1B, the wells 106 contain reagents, however, the wells 106 may contain other liquids. For example, the liquids may be any suitable process liquid, such as buffers, and/or wash liquids. In the embodiment depicted in FIG. 1B, the first well 106A contains a first reagent 110A, the second well 106B contains a second reagent 110B, the third well 106C contains a third reagent 110C, and the fourth well 106D contains a fourth reagent 110D. The various reagents 110A-110D may be the same or different.

The reagent pack 104A may include a cover 112 having a cover top surface 112T and a cover bottom surface 112B. The cover 112 may be affixed to the reagent pack top surface 108T and may seal the wells 106. For example, the cover bottom surface 112B may be affixed, such as adhered by a suitable adhesive, to the reagent pack top surface 108T in a manner that seals around the openings of the wells 106. In the embodiment depicted in FIG. 1B, the reagent pack 104A includes a cover 112 that may be a single piece cover and that seals all the wells 106. In other embodiments, the reagent pack 104A may include individual covers that individually seal the wells 106.

The cover 112 may be made of a material, such as a metal foil, that may be pierced by a pipette tip (e.g., pipette tip 134—FIG. 1C) as described herein. The material may also prevent leakage of the reagents or other liquids contained in the wells 106. The material may also prevent contaminants from entering the wells 106 and vapors from entering and/or exiting the wells 106. In some embodiments, the cover 112 includes at least one layer of plastic and/or metal, such as aluminum. In some embodiments, the cover 112 includes an aluminum layer and a plastic layer, or even a metal layer sandwiched by plastic layers.

Referring again to FIG. 1A, the testing apparatus 100 may include a sample carousel 102B that supports and/or receives a plurality of vessels 114 therein. The vessels 114 may contain at least liquid samples acquired from patients. In some embodiments, the sample vessels can be cuvettes. In some embodiments, the sample carousel 102B may be an incubation ring carousel or other type of carousel that prepares samples for testing. Both the reagent carousel 102A and the sample carousel 102B may include electromechanical devices (e.g., motors—not shown) that rotate the reagent carousel 102A and the sample carousel 102B. Both the reagent carousel 102A and the sample carousel 102B may be electrically coupled to a controller 116 that generates signals to operate the electromagnetic devices and other system components.

The testing apparatus 100 may include a robot 118 that is configured to transport a pipetting system 122 between the wells 106 in the reagent carousel 102A and the vessels 114 in the sample carousel 102B. The robot 118 may include any suitable configuration and may include an arm 118A to which the pipetting system 122 is attached. In the embodiment depicted in FIG. 1A, the robot 118 is configured to move the arm 118A, and thus the pipetting system 122, along an arc 124 between the reagent carousel 102A and the sample carousel 102B. The robot 118 may be configured to move the pipetting system 122 in other directions than theta, such as r (extension and retraction along the arm 118A) and/or combinations with X, Y, and Z (into and out of the paper in FIG. 1A). The robot 118 may be electrically coupled to the controller 116, which may generate signals to operate the robot 118.

The testing apparatus 100 may include an aspiration/dispense system 126 that may be coupled to the pipetting system 122 by a conduit 128. The aspiration/dispense system 126 may control amounts of liquids aspirated and/or dispensed by the pipetting system 122. The aspiration/dispense system 126 may be electrically coupled to the controller 116, which controls one or more pumps responsive to one or more sensors (not shown) and the like to perform aspiration and/or dispensing.

Figure 1D:
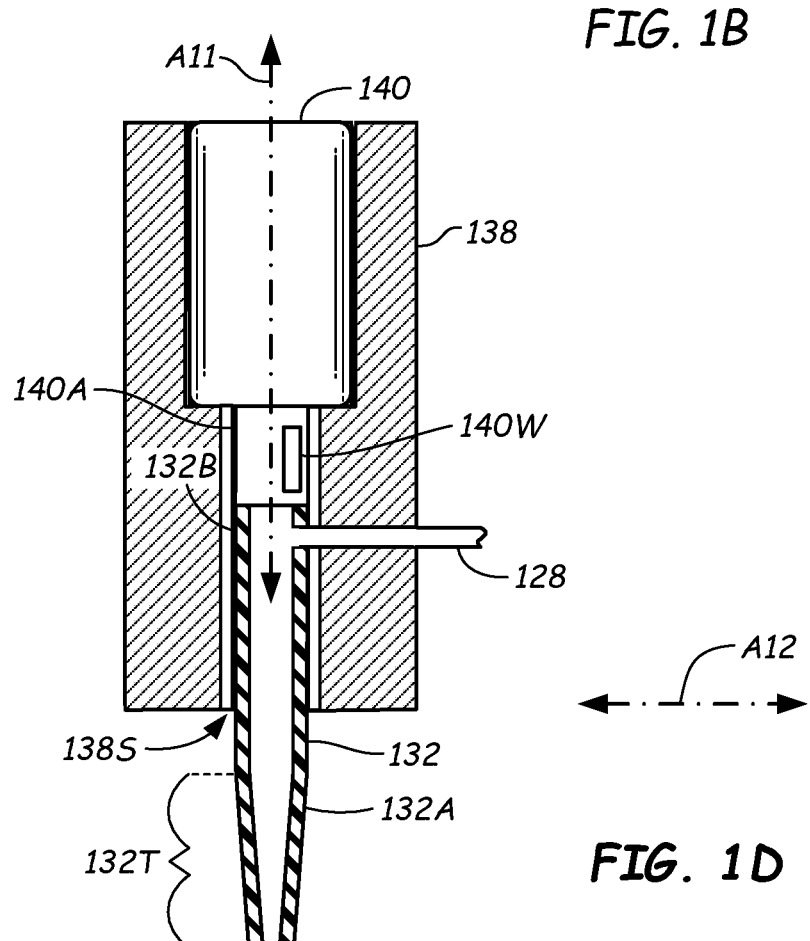
FIG. 1D illustrates a cross-sectioned side view of a portion of a pipette assembly including a vibration inducer, wherein the vibration inducer shown includes a rotatable offset weight that causes a pipette tip to vibrate according to one or more embodiments.
Figure 1C:
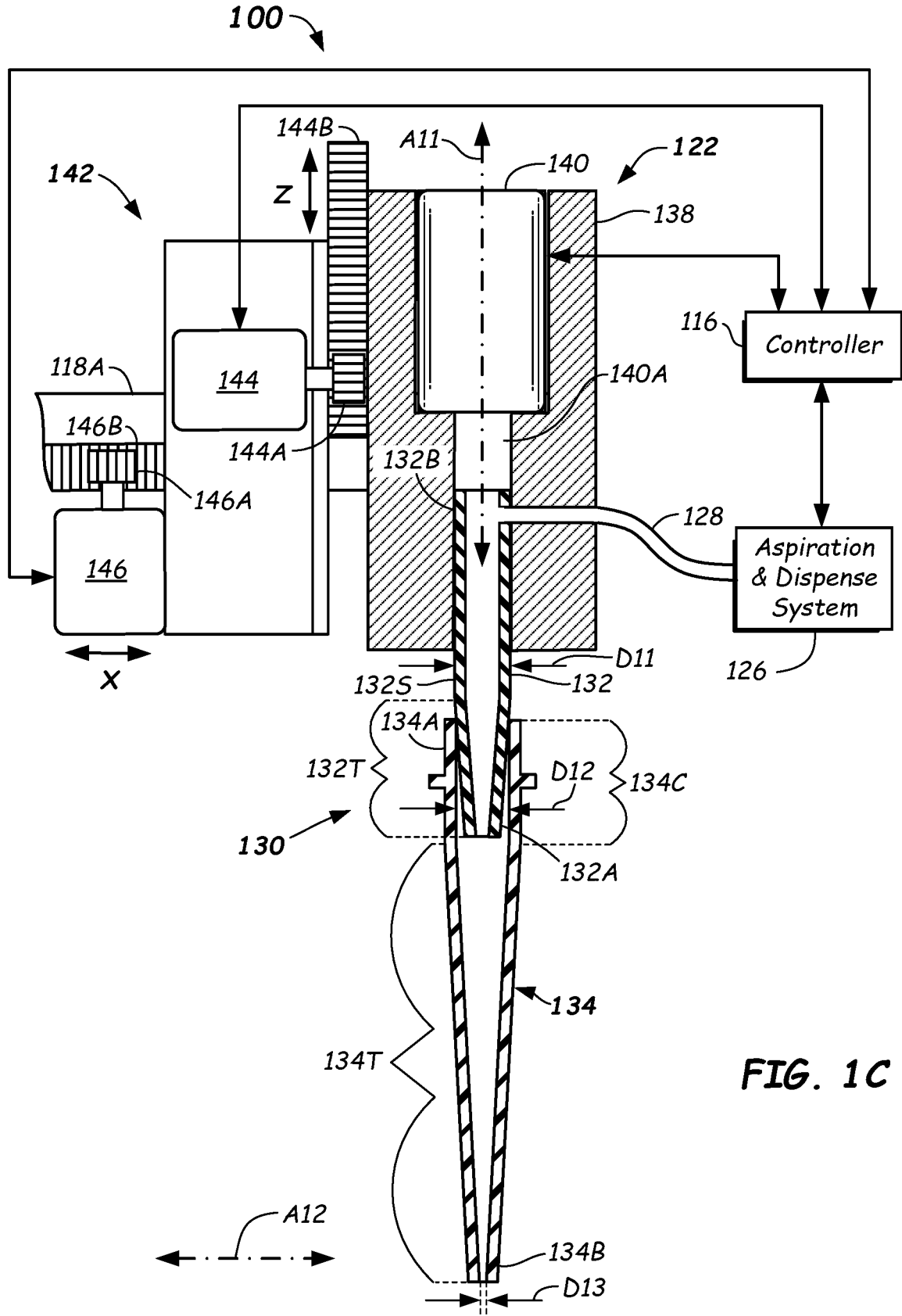
FIG. 1C illustrates a partial cross-sectioned side view of a pipetting system that may be included in a testing apparatus according to one or more embodiments.

Additional reference is made to FIG. 1C, which illustrates a partial cross-sectioned view of the pipetting system 122. A pipette assembly 130 may be attached to or be included with the pipetting system 122. The pipette assembly 130 may be configured to dispense and/or aspirate liquids into or out of the wells 106 (FIG. 1A) and/or the vessels 114 (FIG. 1A). The pipette assembly 130 may include a pipette 132 (e.g., a pipette body) having a pipette terminal end 132A and a pipette upper end 132B. The pipette 132 also has an outer surface 132S. The pipette terminal end 132A may include a pipette tapered portion 132T or may be proximate the pipette tapered portion 132T. The pipette tapered portion 132T may transition a pipette widest transverse dimension D11 measured across the outer surface 132S to a smaller transverse dimension.

A pipette tip 134 may be detachably coupled to the pipette terminal end 132A of the pipette 132. The pipette tip 134 may include a tip first end 134A that may include a cylindrical portion 134C. The cylindrical portion 134C may have a first inner transverse dimension D12 that is smaller than the pipette widest transverse dimension D11. The first inner transverse dimension D12 may enable a friction fit to secure the pipette tip 134 to the pipette terminal end 132A. Other suitable coupling configurations may be used.

The pipette tip 134 may include a tip second end 134B located opposite the tip first end 134A. The tip second end 134B may have an opening with a second inner transverse dimension D13 that is smaller than the first inner transverse dimension D12. The tip second end 134B may be configured to pierce the cover 112 (FIG. 1B) of the reagent pack 104A (FIG. 1B) or covers of other vessels and/or wells present in the testing apparatus 100. The pipette tip 134 may include a tip tapered portion 134T extending at least partially between the tip first end 134A and the tip second end 134B. The tip tapered portion 134T may transition the pipette tip 134 between the first inner transverse dimension D12 and the second inner transverse dimension D13.

The pipetting system 122 may include a body 138 that receives or is coupled to at least a portion of the pipette assembly 130 or at least a portion of the pipette 132. The body 138 may be a rigid structure that supports the pipette assembly 130. The pipetting system 122 may also include a vibration inducer 140 that may be located within the body 138, for example. In other embodiments, the vibration inducer 140 may otherwise be coupled to the pipetting system 122, such as located external to the body 138.

The vibration inducer 140 may be coupled to the pipette 132 and may be configured to vibrate or impart vibration to the pipette tip 134 when at least a portion of the pipette tip 134 is located in a well. In some embodiments, the vibration inducer 140 may be configured to vibrate the pipette tip 134 when the pipette tip is at least one of being inserted through a cover (e.g., cover 112—FIG. 1B) or retracted from the cover as described below. The vibration of the pipette tip 134 operates to reduce stiction or static friction between the cover 112 and the pipette tip 134. In some embodiments, the vibration inducer 140 includes a shaft 140A that is coupled to the pipette upper end 132B, wherein the vibration inducer 140 vibrates the shaft 140A. The conduit 128 may couple to the pipette 132 and may have enough flexibility to accommodate vibrations generated by the vibration inducer 140.

An axial axis A11 may extend through the vibration inducer 140 and/or the pipette assembly 130. The vibration inducer 140 may impart axial vibration into the pipette tip 134 along the axial axis A11. In some embodiments, the vibration inducer 140 may provide a peak-to-peak vibrational amplitude in a range from 0.3 mm to 1.5 mm. In other embodiments, the vibration inducer 140 may provide a peak-to-peak vibrational amplitude in a range from 0.4 mm to 1.0 mm. In some embodiments, the vibration inducer 140 may provide a vibrational frequency in a range from 10.0 Hz to 300.0 Hz. In other embodiments, the vibration inducer 140 may provide a vibrational frequency in a range from 50.0 Hz to 200.0 Hz.

In some embodiments, the vibration inducer 140 may provide and/or impart radial vibration to the pipette tip 134. For example, the vibration inducer 140 may vibrate the shaft 140A along an axis A12, which can vibrate the pipette tip 134 along the axis A12. In certain embodiments, the imparted vibration of the vibration inducer 140 imparts primary, cantilever mode vibration to the pipette tip 134 so that the vibration at the tip second end 134B is maximized. With additional reference to FIG. 1D, in some embodiments, the body 138 may include a space 138S between the shaft 140A and the pipette 132 to enable radial movement of the shaft 140A and the pipette 132. In some embodiments, the vibration inducer 140 vibrates the pipette tip 134 in a plane (not shown) wherein the axis A12 is in the plane. In some embodiments, the pipette tip 134 may be vibrated in a circular mode in the plane at the tip second end 134B. In other embodiments, the vibration inducer 140 may vibrate the pipette tip 134 in an arcuate motion. In other embodiments, the vibration inducer 140 may vibrate the pipette tip 134 in a whirl motion. Other suitable vibrational modes may be imparted by the vibration inducer 140.

In some embodiments, the vibration inducer 140 may rotate the pipette 132 or oscillate the pipette 132. In such embodiments, the pipette 132 may be offset from the shaft 140A and/or the axis A11, which may cause the pipette tip 134 to oscillate or even induce a whirl vibration relative to the axis A11. FIG. 1D illustrates an embodiment of the vibration inducer 140 including a rotatable offset weight 140W that causes the pipette tip 134 (FIG. 1C) to oscillate relative to the axis A11 when the shaft 140A rotates. In the embodiment of FIG. 1D, the shaft 140A may include the rotatable offset weight 140W offset a radial distance from the A11 axis. In other embodiments, the offset weight 140W may be located within the vibration inducer 140.

In some embodiments, the vibration inducer 140 may include an active tuned absorber. In such embodiments, the vibration inducer 140 may include a ferromagnetic element coupled to the pipette assembly 130 and an electromagnet that is switched on and off at a rate approximate the vibrational frequency. A spring may also be coupled between the pipette assembly 130 and the body 138 (FIG. 1C) to provide oscillation (e.g., vibration), such as at or near a natural frequency. In some embodiments, the vibration inducer 140 may impart vibration by the use of a pneumatic linear actuator with pressure oscillation. In such embodiments a mass, such as the shaft 140A (FIG. 1D) or a weight, may tune the system to a natural frequency or vibration.

The vibration imparted to the pipette tip 134 may cause the pipette tip 134 to move between a first location and a second location at least twice. In some embodiments, the vibration imparted to the pipette tip 134 may have a frequency equal to or greater than 10 Hz. In other embodiments, the vibration imparted to the pipette tip 134 may have a frequency equal to or greater than 50 Hz. In some embodiments, the vibration imparted to the pipette tip 134 may have a maximum frequency of 200 Hz. In other embodiments, the maximum frequency may be 300 Hz. In some embodiments, the vibration imparted to the pipette tip 134 may have a frequency ranging from 10 Hz to 200 Hz. The low frequency vibration may prevent the pipette tip 134 and the pipette 132 from separating due to the imparted vibration.

Referring again to FIG. 1C, a robot 142 may be configured to move the pipetting system 122 in a Z-direction, and possibly also in an X-direction relative to a fixture, such as the arm 118A (FIG. 1A). For example, the robot 142 may be configured to move the body 138 and components attached thereto. The robot 142 may include a Z-motor 144 that is configured to rotate a Z-pinion 144A relative to a Z-rack 144B coupled to the body 138. As the Z-motor 144 rotates, the pipetting system 122, including the pipette tip 134, moves in the Z-direction, which may be referred to herein as moving up and down. The robot 142 may also include an X-motor 146 that is configured to rotate an X-pinion 146A relative to an X-rack 146B coupled to the arm 118A. As the X-motor 146 rotates, the pipetting system 122, including the pipette tip 134, moves in the X-direction, which may be referred to herein as moving left and right. Other mechanisms may be used to move the pipetting system 122 in the Z-direction and the X-direction. In some embodiments, other mechanisms may be used to move the pipetting system 122 in a Y-direction, which is normal to both the X-direction and the Z-direction. Thus, the robot 142 may be designed to cause Z motion, X motion, Y motion, r motion, theta motion, or any combination thereof.

Additional reference is made to FIG. 2A, which illustrates an elevational side view of the pipetting system 122 shown attaching the pipette tip 134 to the pipette 132. Additional reference is also made to FIG. 2B, which illustrates a side elevation view of the pipetting system 122 with the pipette tip 134 successfully attached to the pipette 132.

The pipette tip 134 depicted in FIGS. 2A-2B may include an extension 234D that may facilitate insertion of the pipette tip 134 onto the pipette 132 and removal of the pipette tip 134 from the pipette 132. For example, the pipette tip 134 may be moved to a location where a stationary structure (not shown) may engage the extension 234D (e.g., flange) during removal and/or insertion of the pipette tip 134 relative to the pipette 132 as described herein. The stationary structure may hold the pipette tip 134 as the pipette terminal end 132A moves into or out of the pipette tip 134.

The pipetting system 122 depicted in FIG. 2A is shown inserting the pipette terminal end 132A into the pipette tip 134. The pipette tip 134 may be held in a fixed position during insertion. For example, a stationary structure may hold the pipette tip 134 via the extension 234D. The pipetting system 122 may move the pipette 132 to a location where the pipette terminal end 132A is located above the tip first end 134A. The pipetting system 122 may then be lowered so that the pipette terminal end 132A is inserted into the tip first end 134A as shown in FIG. 2B. Friction may secure the pipette tip 134 to the pipette 132. The pipetting system 122 may then move the pipette assembly 130 to wells 106 (FIG. 1A) or other locations to aspirate and/or dispense liquids.

Figure 3:
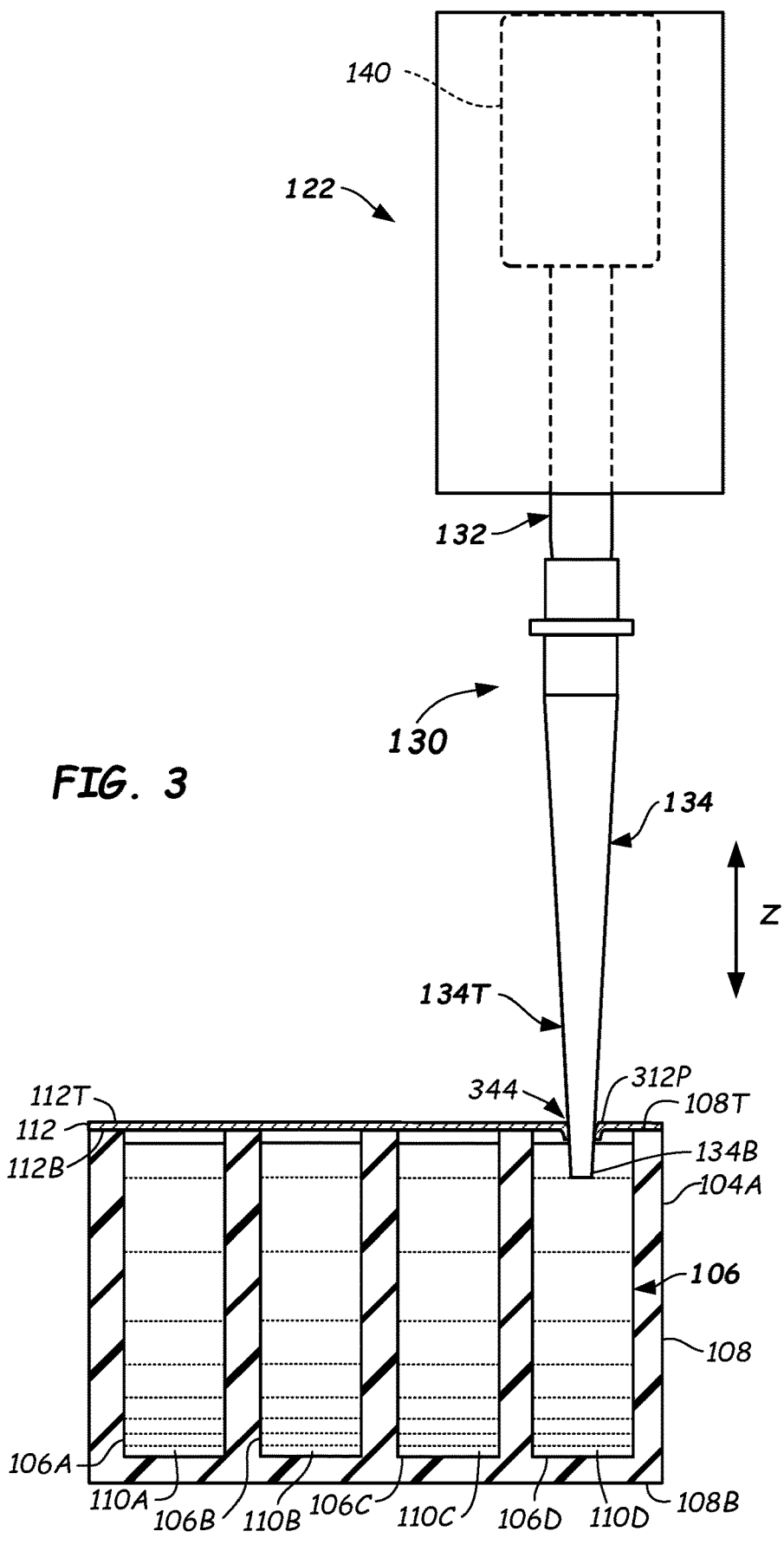
FIG. 3 illustrates a partial side view of a pipetting system and a partial cross-sectioned side view of a reagent pack with a pipette tip piercing a cover covering a well of the reagent pack according to one or more embodiments.

Additional reference is made to FIG. 3, which illustrates the pipette tip 134 piercing the cover 112 over the fourth well 106D of the reagent pack 104A. The pipetting system 122 has been moved downward in the Z-direction toward the reagent pack 104A. As the pipetting system 122 continues to move downward in the Z-direction, the tip second end 134B pierces the cover 112 at a pierced location 312P to create an opening 344. The tip tapered portion 134T widens the opening 344 as the pipetting system 122 continues to move downward in the Z-direction. Eventually, the pipetting system 122 stops moving in the Z-direction and the pipette assembly 130 may aspirate the fourth reagent 110D from the fourth well 106D.

As shown in FIG. 3, the cover 112 in the pierced location 312P has wrapped downward and a portion of the cover 112 is in contact with the tip tapered portion 134T. When the pipetting system 122 stops moving the pipette tip 134 downward in the Z-direction, there is static friction (referred to as "stiction" herein) between the portion of the cover 112 and the pipette tip 134 that contact each other. The stiction can be caused in part by the downward curving portion of the cover 112 that contacts the pipette tip 134. The stiction and the downward curvature of the cover 112, individually or in combination, may cause a retention force that exceeds the coupling force between the pipette 132 and the pipette tip 134 when the robot is operated to move the pipette 132 in the upward Z-direction required to retract the pipette tip 134 from fourth well 106D.

Figure 4:
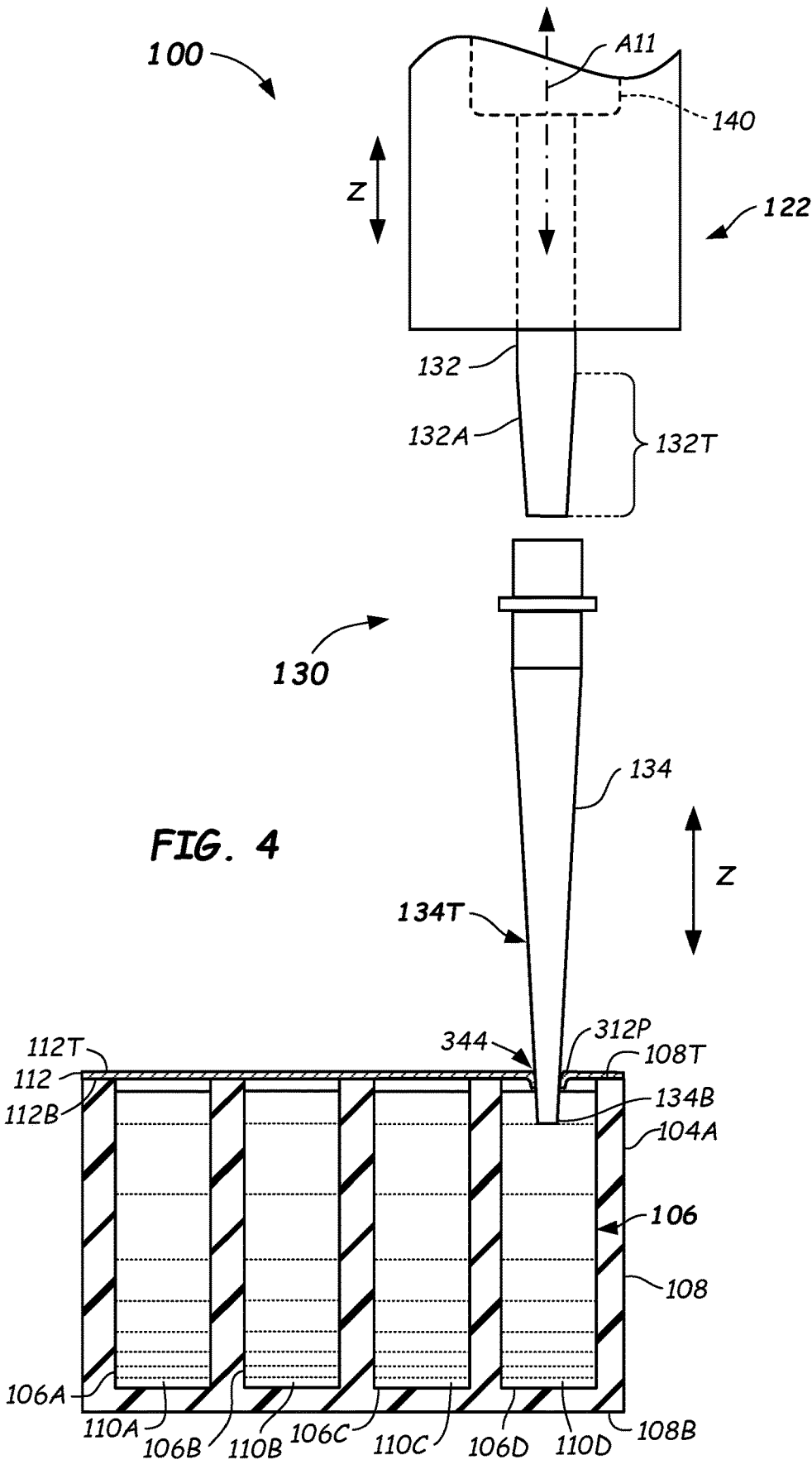
FIG. 4 illustrates a partial side view of a pipetting system and a partial cross-sectioned side view of a reagent pack with a pipette tip retracting from a well of the reagent pack, wherein the pipette tip has become stuck in the well and has disengaged from a pipette according to one or more embodiments of the prior art.

Reference is made to FIG. 4, which illustrates the pipetting system 122 retracting the pipette assembly 130 from the fourth well 106D, wherein the pipette tip 134 gets stuck in the fourth well 106D and has separated from the pipette 132. In the situation illustrated in FIG. 4, the retention force (e.g., stiction) retaining the pipette tip 134 in the fourth well 106D is greater than the coupling force due, for example, to the friction force retaining the pipette tip 134 in the pipette 132. Accordingly, the pipette tip 134 has separated from the pipette 132 and, in the embodiment depicted in FIG. 4, has remained in the fourth well 106D. In embodiments wherein the testing apparatus 100 is automated, all testing related to the pipetting system 122 may be stopped until an operator can manually remove the stuck pipette tip 134 from the fourth well 106D. In some instances, the time to correct the problem may be excessive and may cause delays in testing. In some situations, the delays may cause samples to be discarded, which may be both costly and time consuming.

Figure 5:
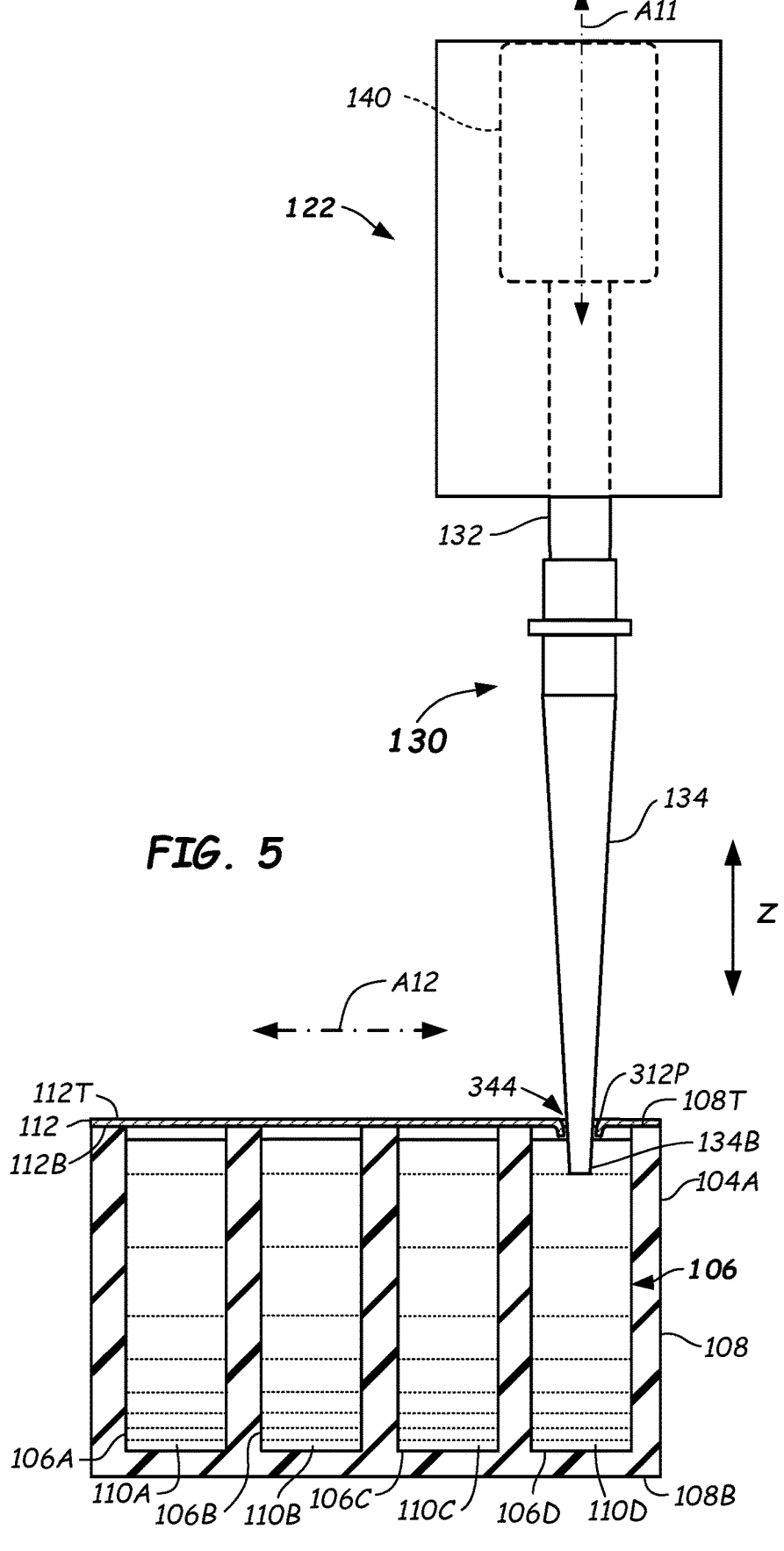
FIG. 5 illustrates a partial side view of a pipetting system and a partial cross-sectioned side view of a reagent pack with a pipette tip having been vibrated while received in a well of the reagent pack according to one or more embodiments.

Additional reference is made to FIG. 5, which illustrates the pipetting system 122 and a cross-sectioned view of the reagent pack 104A with the pipette tip 134 being, or having been, vibrated while received in the fourth well 106D. The vibration of the pipette tip 134 relative to the cover 112 has reduced stiction between the cover 112 and the pipette tip 134. For example, the vibration imparted in an axial direction along the axial axis A11 has increased the size of the opening 344 and has caused a separation (a gap) between the pipette tip 134 and the cover 112. Thus, the pipette tip 134 may have no contact or limited contact with the cover 112, which may reduce or eliminate the stiction.

As described above, in some embodiments, the vibration inducer 140 may impart vibration along an axis A12 and or in a plane including the axis A12. In other embodiments, the vibration inducer 140 may impart vibration along an arc or the vibration inducer 140 may impart rotational or whirling vibration. In all these embodiments, the stiction between the pipette tip 134 and the cover 112 may be reduced by the vibration by producing a gap between the cover 112 and the pipette tip 134. For example, all these embodiments may separate the pipette tip 134 from the cover 112.

In some embodiments, the above-described vibration is imparted to the pipette tip 134 as the pipette tip 134 pierces the cover 112 and/or is inserted through the cover 112. In some embodiments, the vibration is imparted to the pipette tip 134 as the pipette tip 134 is moved downward in the Z-direction until the pipette tip 134 stops moving. In some embodiments, the vibration is imparted just before the pipette tip 134 starts moving upward in the Z-direction as the pipette tip 134 is being retracted from a well. In some embodiments, the vibration ceases after the pipette tip 134 starts being retracted from a well 106, which may reduce splashing of the liquid in the well 106. In some embodiments, the vibration is imparted on the pipette tip 134 before the pipette tip 134 is moved upward in the Z-direction to retract the pipette tip 134 from a well. In some embodiments, the vibration is imparted on the pipette tip 134 when the pipette tip is at least one of being inserted through the cover 112 or retracted from the cover 112. In some embodiments, the imparting vibration to the pipette tip 134 can cause stirring of the liquid in the well 106.

In some embodiments, the vibration is stopped before the pipette tip 134 extends above the cover 112 during retraction of the pipette tip 134 from a well 106. Such an embodiment may prevent liquid from spraying off the pipette tip 134. In some embodiments, the vibration is stopped before the pipette tip 134 extends above a liquid during retraction of the pipette tip 134 from a well. In some embodiments, the vibration commences prior to retraction of the pipette tip 134 from a well 106 and ceases prior to the pipette tip 134 extending above a liquid in the well 106 upon retraction of the pipette tip 134 from a well 106.

Reference is now made to FIG. 1C to describe embodiments wherein vibration is imparted by at least one of the Z-motor 144, the X-motor 146, or other like motors (not shown). In such embodiments, at least one of the Z-motor, the X-motor, or a Y-motor (not shown) may be vibration inducers. The Y-motor may move the pipetting system 122 in the Y-direction. For example, the controller 116 may instruct the Z-motor 144, the X-motor 146, and/or the Y-motor to oscillate at a vibrational frequency as described herein. The pipette tip 134 may then vibrate as described herein. The Z-motor 144, the X-motor 146, and/or the Y-motor may impart axial vibration, radial vibration, or combinations thereof to the pipette tip 134. In such embodiments, the vibration inducer 140 may not be included in the testing apparatus 100 because at least one of the Z-motor 144, the X-motor 146, and/or the Y-motor may serve as the vibration inducer.

According to a method aspect, a method 600 of moving a pipette assembly (e.g., pipette assembly 130) adapted to aspirate a liquid (e.g., fourth reagent 110D) is illustrated in the flowchart of FIG. 6. The method 600 includes, at 602, providing a well (e.g., fourth well 106D) containing the liquid and including a cover (e.g., cover 112). The method includes, at 604, providing a pipette assembly (e.g., pipette assembly 130) configured to aspirate the liquid, the pipette assembly comprising a pipette (e.g., pipette 132) including a terminal end (e.g., pipette terminal end 132A) and a pipette tip (e.g., pipette tip 134) detachably coupled to the terminal end. The method includes, at 606, imparting vibration to the pipette tip when at least a portion of the pipette tip is located in the well thus reducing stiction between the cover and the pipette tip.

While the disclosure is susceptible to various modifications and alternative forms, specific assembly and apparatus embodiments and methods thereof have been shown by way of example in the drawings and are described in detail herein. It should be understood, however, that it is not intended to limit the disclosure to the particular assemblies, apparatus, or methods disclosed, but, to the contrary, the intention is to cover all modifications, equivalents, and alternatives falling within the scope of the claims.

What is claimed is:

1. A pipette system configured to aspirate liquid from a well having a cover, comprising:
   a pipette including a terminal end and an upper end located opposite the terminal end;
   a pipette tip detachably coupled to the terminal end; and
   a vibration inducer positioned above the pipette and including a shaft coupled to the upper end of the pipette, the shaft including an offset weight that is offset a radial distance from a central axial axis extending through the vibration inducer and the shaft, the shaft and the offset weight each rotatable about the central axial axis, the vibration inducer configured to vibrate the pipette tip when at least a portion of the pipette tip is located in the well thus reducing stiction between the cover and the pipette tip.

2. The pipette system of claim 1, wherein the vibration inducer provides a vibration comprising a peak-to-peak vibrational amplitude less than 1.0 mm.

3. The pipette system of claim 1, wherein the vibration inducer provides a vibration comprising a vibrational frequency in a range from 10.0 Hz to 200.0 Hz.

4. The pipette system of claim 1, wherein the vibration inducer is configured to induce axial vibration along an axial axis of the pipette tip.

5. The pipette system of claim 1, wherein the vibration inducer is configured to induce radial vibration to the pipette tip.

6. The pipette system of claim 1, further comprising a body wherein the vibration inducer is located within the body, the body and the shaft separated from each other by a space therebetween.

7. A testing apparatus comprising the pipette system of claim 1, the well containing the liquid, wherein the well is part of a reagent pack, and the liquid is a reagent, a buffer, or a wash liquid, and a reader for determining a concentration level of an analyte or constituent in a specimen aspirated from the well with the pipette system.

8. The pipette system of claim 1, wherein the vibration inducer is configured to vibrate the pipette tip when the pipette tip is at least one of being inserted through the cover or retracted from the cover.

9. The pipette system of claim 1, wherein the vibration inducer is configured to vibrate the pipette tip axially as the pipette tip is at least one of being inserted through the cover or retracted from the cover.

10. The pipette system of claim 1, wherein the pipette tip is configured to pierce the cover and the vibration inducer is configured to vibrate the pipette tip as the pipette tip is piercing the cover.

11. The pipette system of claim 1, wherein the pipette tip is further configured to stir the liquid in the well.

12. A testing apparatus, comprising:

a well containing a liquid and including a cover;

a pipette system configured to aspirate the liquid contained in the well, the pipette system comprising:

a pipette including a terminal end and an upper end located opposite the terminal end;

a pipette tip detachably coupled to the terminal end; and a vibration inducer positioned above the pipette and including a shaft coupled to the upper end of the pipette, the shaft including an offset weight that is offset a radial distance from a central axial axis extending through the vibration inducer and the shaft, the shaft and the offset weight each rotatable about the central axial axis, the vibration inducer configured to vibrate the pipette tip when at least a portion of the pipette tip is located in the well thus reducing stiction between the cover and the pipette tip; and a reader for determining a concentration level of an analyte or constituent in a specimen aspirated from the well with the pipette system.

13. A method of moving a pipette assembly adapted to aspirate a liquid, comprising:

providing a well containing the liquid and including a cover;

providing the pipette assembly configured to aspirate the liquid, the pipette assembly comprising a pipette including a terminal end and a pipette tip detachably coupled to the terminal end; and imparting vibration to the pipette tip via a vibration inducer positioned above the pipette and including a shaft coupled to an upper end of the pipette opposite the terminal end when at least a portion of the pipette tip is located in the well thus reducing stiction between the cover and the pipette tip, the shaft including an offset weight that is offset a radial distance from a central axial axis extending through the vibration inducer and the shaft, the shaft and the offset weight each rotatable about the central axial axis.

14. The method of claim 13, comprising imparting vibration to the pipette tip during piercing of the cover with the pipette tip.

15. The method of claim 13, wherein imparting vibration comprises imparting axial vibration to the pipette tip.

16. The method of claim 13, wherein imparting vibration comprises imparting radial vibration to the pipette tip.

17. The method of claim 13, comprising:

retracting the pipette tip from the well; and stopping vibration of the pipette tip before the pipette tip extends above the cover during retraction of the pipette tip from the well.

18. The method of claim 13, comprising:

retracting the pipette tip from the liquid in the well; and stopping vibration of the pipette tip before the pipette tip extends above the liquid during retraction of the pipette tip from the well.

19. The method of claim 13, comprising imparting further vibration to the pipette tip to stir the liquid in the well.

20. The method of claim 13, wherein imparting vibration commences prior to retraction of the pipette tip from the well and ceases prior to the pipette tip extending above the liquid in the well upon retraction of the pipette tip from the well.

\* \* \* \* \*